(12) United States Patent
Nielsen et al.

(10) Patent No.: US 8,117,364 B2
(45) Date of Patent: Feb. 14, 2012

(54) ENHANCED PROTOCOL AND ARCHITECTURE FOR LOW BANDWIDTH FORCE FEEDBACK GAME CONTROLLER

(75) Inventors: Kurt Torben Nielsen, Fall City, WA (US); Loren Douglas Reas, Kent, WA (US)

(73) Assignee: Microsoft Corporation, Redmond, WA (US)

( * ) Notice: Subject to any disclaimer, the term of this patent is extended or adjusted under 35 U.S.C. 154(b) by 1027 days.

(21) Appl. No.: 11/939,218

(22) Filed: Nov. 13, 2007

(65) Prior Publication Data

US 2009/0122006 A1 May 14, 2009

(51) Int. Cl.
*G06F 9/30* (2006.01)
(52) U.S. Cl. .......................... 710/104; 710/5
(58) Field of Classification Search .................. 345/156; 710/5, 104
See application file for complete search history.

(56) References Cited

U.S. PATENT DOCUMENTS

| | | | | |
|---|---|---|---|---|
| 6,071,194 | A | 6/2000 | Sanderson et al. | 463/37 |
| 6,184,868 | B1 | 2/2001 | Shahoian et al. | 345/161 |
| 6,563,487 | B2 | 5/2003 | Martin et al. | 345/156 |
| 6,636,197 | B1 * | 10/2003 | Goldenberg et al. | 345/156 |
| 6,686,901 | B2 | 2/2004 | Rosenberg | 345/156 |
| 6,710,764 | B1 * | 3/2004 | Burgel et al. | 345/156 |
| 6,933,920 | B2 | 8/2005 | Lacroix et al. | 345/156 |
| 7,348,968 | B2 * | 3/2008 | Dawson | 345/179 |
| 2005/0128186 | A1 | 6/2005 | Shahoian et al. | 345/161 |
| 2006/0119572 | A1 | 6/2006 | Lanier | 345/156 |
| 2006/0282170 | A1 | 12/2006 | Hardwick et al. | 623/22.3 |
| 2007/0040815 | A1 | 2/2007 | Rosenberg et al. | 345/173 |
| 2007/0080929 | A1 | 4/2007 | Hardwick | 345/156 |
| 2009/0079690 | A1 * | 3/2009 | Watson et al. | 345/156 |

OTHER PUBLICATIONS

MacLean, K.E., "Application-Centered Haptic Interface Design",*Human and Machine Haptics*, Sep. 15, 1999, 10 pages, www.cs.ubc.ca.

Snibble, S.S. et al., "Haptic Techniques for Media Control", *Proceedings of the 14th Annual ACM Symposium on User Interface Software and Technology*, 2001, 10 pages, www.delivery.acm.org.

* cited by examiner

*Primary Examiner* — Alford W. Kindred
*Assistant Examiner* — Benjamin Geib
(74) *Attorney, Agent, or Firm* — Woodcock Washburn LLP

(57) ABSTRACT

Haptic features are stored in a haptic device by preloading or otherwise downloading them, e.g., wirelessly, into the haptic device at the time of manufacture, immediately prior to game play, during game play, and/or at any other time. Haptic features may be activated, deactivated, modified or replaced at any time. All or a subset of the haptic features may be selected as an active play list, which may be modified as necessary. A host may manage some or all device memory and the haptic features stored therein. Haptic features stored in haptic devices and control information provided by the host are used by the haptic device to execute haptic effects. The haptic device may sustain haptic effects between control messages from the host. New communication messages may be added to an underlying communication protocol to support haptic effects. New messages may use header portions of communication packets as payload portions.

18 Claims, 5 Drawing Sheets

ENHANCED PROTOCOL AND ARCHITECTURE FOR LOW BANDWIDTH FORCE FEEDBACK GAME CONTROLLER

TECHNICAL FIELD

The technical field relates generally to haptic devices and, more specifically, to a communication protocol and architecture for haptic devices.

BACKGROUND

Interactive games provide sensory feedback to users through various devices. While displays support the sense of sight and speakers support the sense of sound, haptic devices support the sense of touch. Haptic devices may be stand alone devices or they may be integrated into other devices such as game consoles or game controllers, e.g., joysticks and steering wheels.

In order to convey realistic sensations, haptic devices must be synchronized to the sights and sounds a user experiences during game play. Therefore, haptic devices require relatively high bandwidth, low latency, bi-directional and otherwise supportive communication protocol with the host, e.g., game console or other computer, executing a game application.

In order to improve the realism experienced using existing gaming systems, haptic devices are being adapted to existing gaming systems that have existing communication protocols. However, existing communication protocols may limit force feedback protocol and architecture for haptic devices. A trend towards wireless game controllers may further limit force feedback protocol and architecture for haptic devices. Aspects of existing communication protocols for existing gaming systems, such as header and payload definitions, frame rate, etc., contribute to limit system bandwidth and latency, which may be insufficient to deliver realistic haptic effects.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A wireless haptic device works properly with existing gaming systems by preloading, downloading, or otherwise storing haptic features in haptic device memory to reduce the volume of information that must be communicated from a host to a haptic device during game play. This allows control information, including wirelessly transmitted control information, provided to haptic devices to be reduced to basic controls. The haptic features stored in haptic devices and the control information provided by the host are used by a haptic device to implement haptic effects. Storing haptic features may also allow haptic devices to sustain haptic effects between control messages from a host, e.g., as where a frame rate and other aspects of an underlying communication protocol are insufficient to provide adequate communication bandwidth and latency. A host and device may be configured to allow the host to manage some or all device memory and the haptic features stored therein.

Many haptic features may be preloaded or otherwise downloaded, including wirelessly, into haptic devices at the time of manufacture, immediately prior to game play, during game play, or at any other time. Users may select, modify or create custom haptic features that will be downloaded along with standard haptic features to their haptic device, which may also have native features. Haptic features may be activated, deactivated, modified or replaced at any time as required by game play, including dynamically while a haptic effect corresponding to a haptic feature is being implemented by a haptic device. All or a subset of the haptic features may be selected as an active play list, which may be modified during game play.

The haptic devices work properly with existing gaming systems also by adding new command, request, report or other communication messages absent from an underlying communication protocol. These additional communication messages may use header portions of communication packets as payload portions to increase communication bandwidth for new messaging.

BRIEF DESCRIPTION OF THE DRAWINGS

The foregoing summary, as well as the following detailed description, is better understood when read in conjunction with the appended drawings. For the purpose of illustrating the enhanced protocol and architecture for low bandwidth force feedback game controller, there is shown in the drawings exemplary constructions thereof; however, the enhanced protocol and architecture for low bandwidth force feedback game controller is not limited to the specific methods and instrumentalities disclosed.

DETAILED DESCRIPTION OF ILLUSTRATIVE EMBODIMENTS

Figure 1:
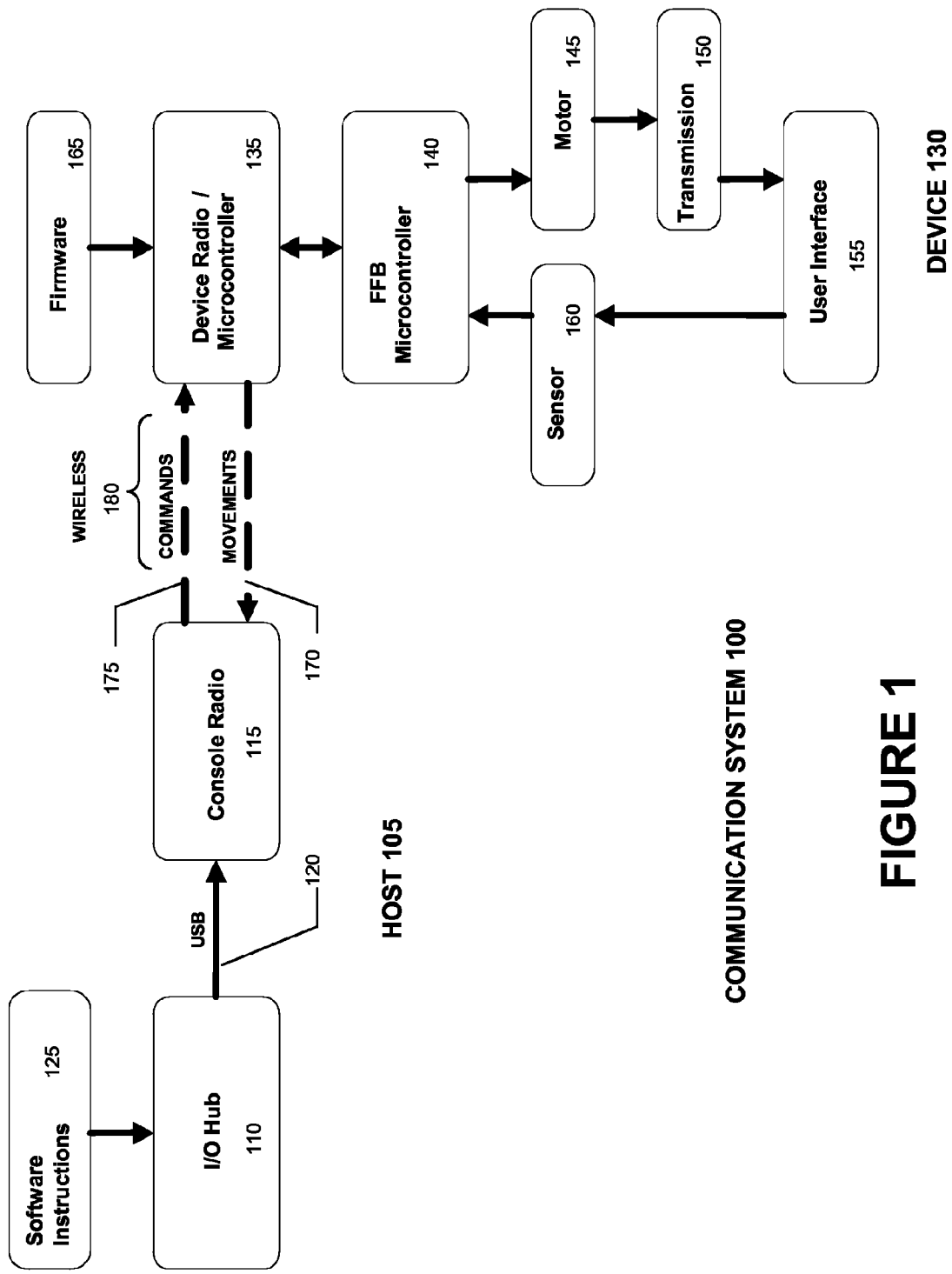
FIG. 1 is a block diagram of an exemplary communication system in which an enhanced protocol and architecture for low bandwidth force feedback game controller can be implemented.

Reference will now be made in detail to embodiments of the present technology for enhanced protocol and architecture for low bandwidth force feedback game controller, examples of which are illustrated in the accompanying drawings. While the technology for enhanced protocol and architecture for low bandwidth force feedback game controller will be described in conjunction with various embodiments, it will be understood that they are not intended to limit the present technology for enhanced protocol and architecture for low bandwidth force feedback game controller to these embodiments. On the contrary, the presented technology for enhanced protocol and architecture for low bandwidth force feedback game controller is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for enhanced protocol and architecture for low bandwidth force feedback game controller. However, the present technology for enhanced protocol and architecture for low bandwidth force feedback game controller may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "opening", "determining", "sequencing", "reading", "loading", "overriding", "writing", "creating", "including", "comparing", "receiving", "providing", "generating", "associating", and "arranging", or the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for enhanced protocol and architecture for low bandwidth force feedback game controller is also well suited to the use of other computer systems such as, for example, optical and mechanical computers. Additionally, it should be understood that in embodiments of the present technology for enhanced protocol and architecture for low bandwidth force feedback game controller, one or more of the steps can be performed manually.

Overview of Terminology

The following terms should be considered in light of the following overviews provided for them as well as the context in which they appear.

Haptic: Of or relating to the sense of touch; tactile.

Tactile: Perceptible to the sense of touch; tangible; of, relating to, or proceeding from the sense of touch.

Force Feedback: Simulated tactile sensation, e.g., applying a controllable torque to a steering wheel to inhibit or aid a user's ability to turn the wheel in order to simulate naturally occurring forces were the user actually steering a vehicle under the circumstances being simulated.

Payload: A message (e.g. instruction and/or data) in a communication packet.

Header: Identification, synchronization and/or other supplemental information (e.g., format or protocol of data) about a message in a payload portion of a communication packet.

Figure 3:
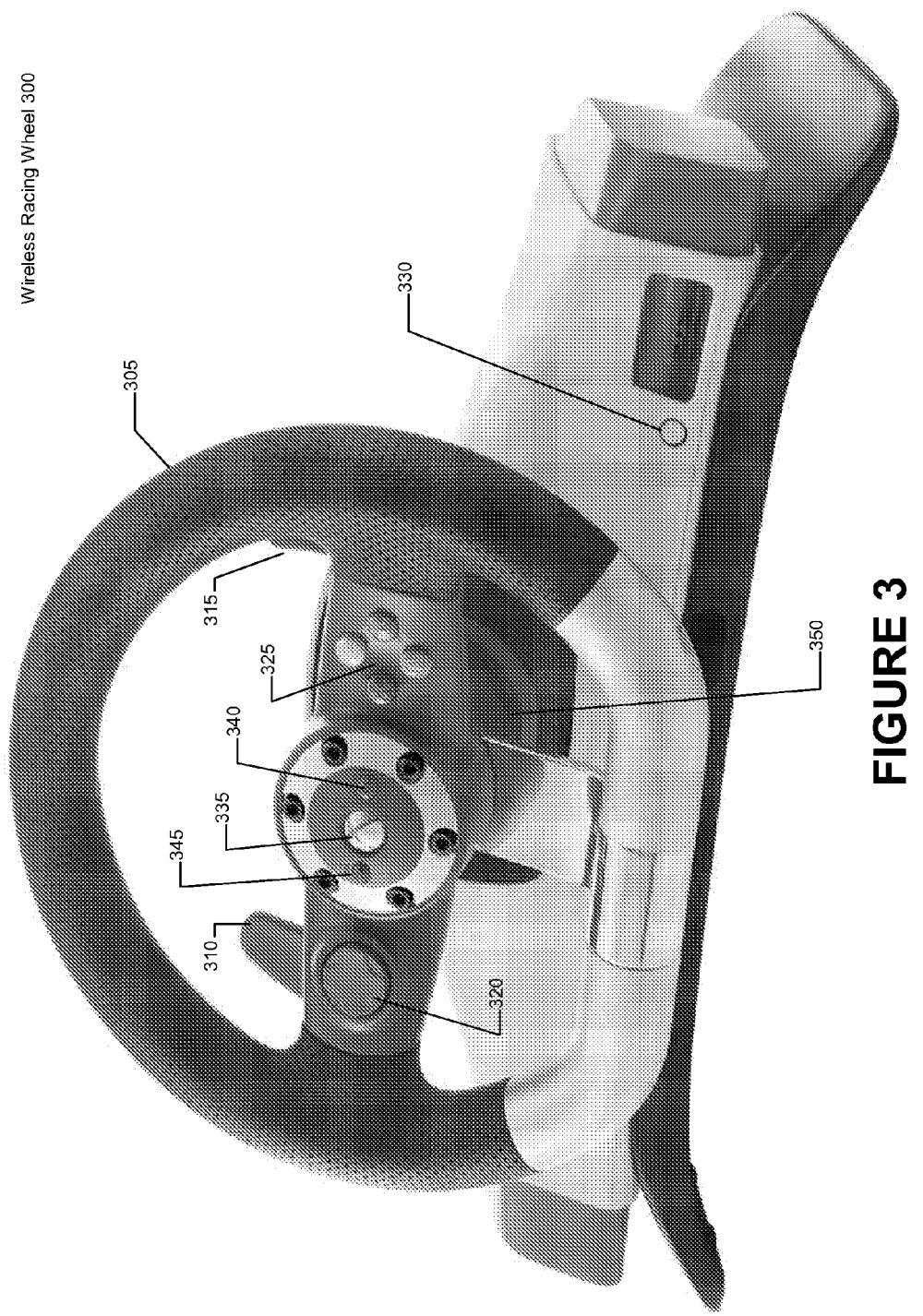
FIG. 3 illustrates an exemplary device in which an enhanced protocol and architecture for low bandwidth force feedback game controller can be implemented.
Figure 4:
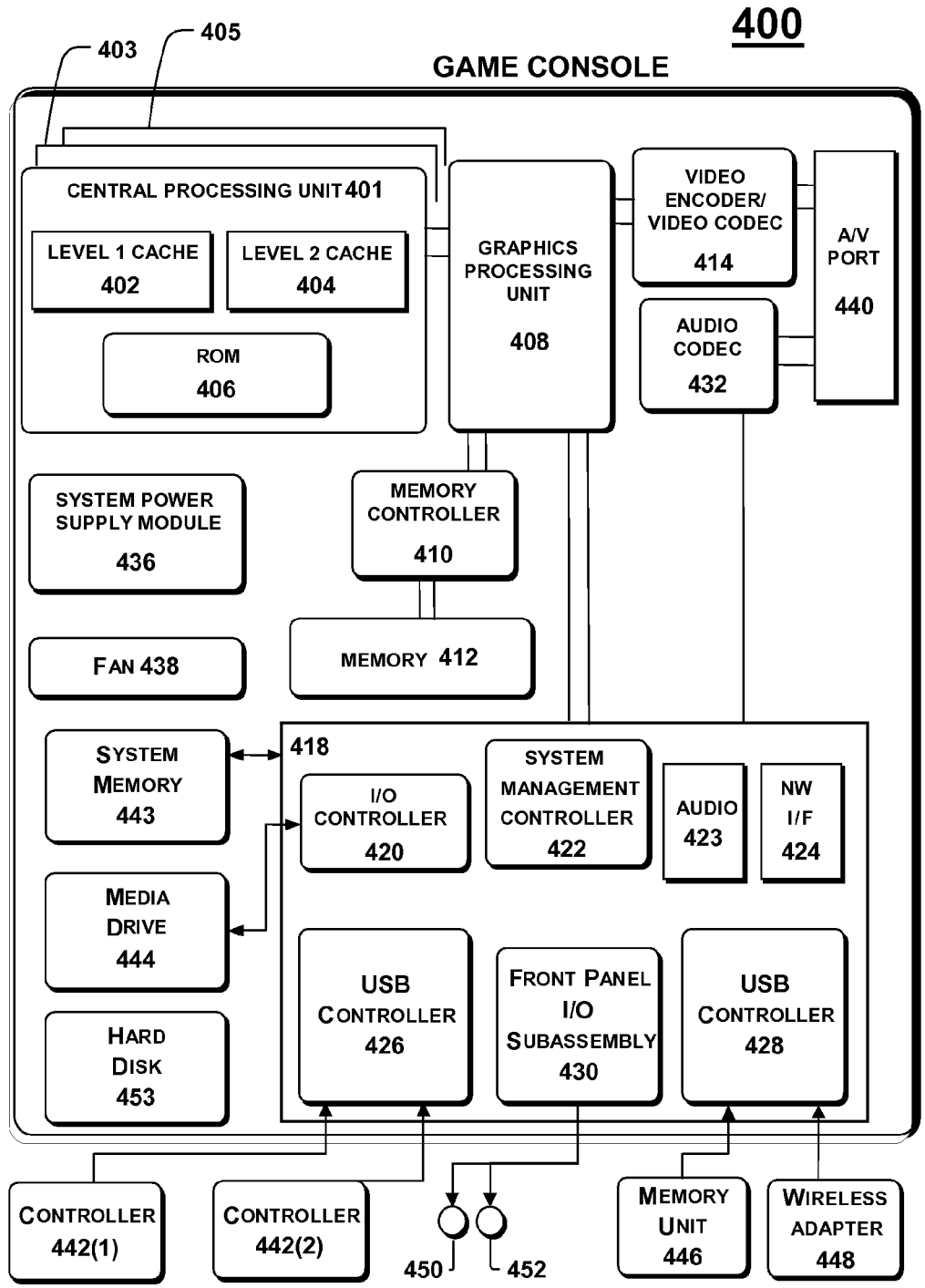
FIG. 4 is a block diagram of an exemplary host game console in which an enhanced protocol and architecture for low bandwidth force feedback game controller can be implemented.
Figure 5:
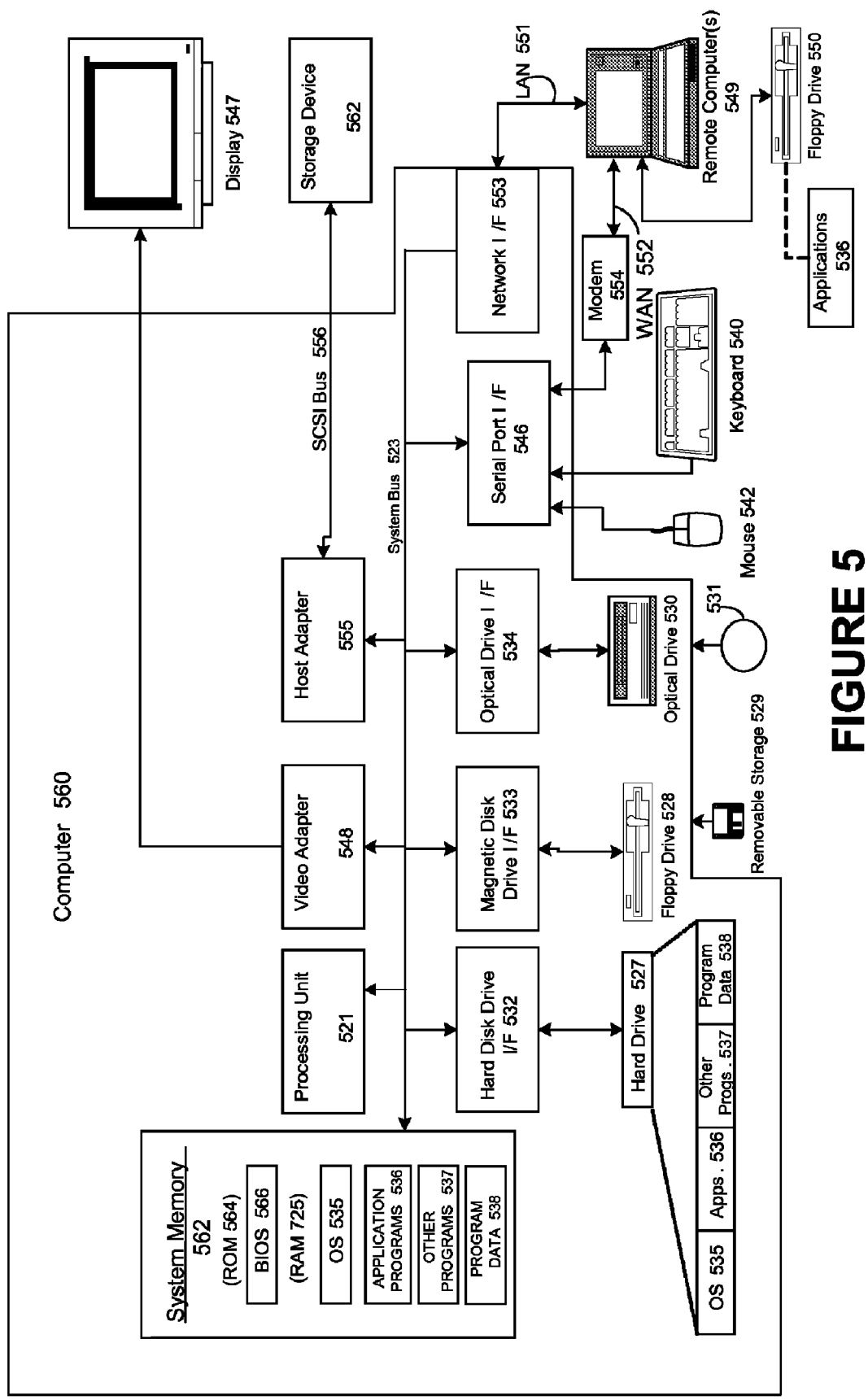
FIG. 5 is a block diagram of an exemplary host computing environment in which enhanced protocol and architecture for low bandwidth force feedback game controller can be implemented.

FIG. 1 is a simplified block diagram of an exemplary communication system between a host and a device, e.g., game controller, in which an enhanced protocol and architecture for low bandwidth force feedback game controller can be implemented. Communication system 100 comprises host 105 and device 130. Numerous components in host 105 and device 130 have been simplified or omitted from FIG. 1 in order to focus on selected features of each. Host 105 may comprise, for example, a gaming console such as Microsoft's XBOX 360™ console or any other general or special purpose computing system capable of communicating with device 130. FIGS. 4 and 5 each illustrate an exemplary host 105. Device 130 may comprise, for example, Microsoft's XBOX 360™ Wireless Racing Wheel or any other haptic device. FIG. 3 illustrates an exemplary device 130. It is understood that host 105 and device 130 must be compatible with one another in order for communication system 100 to operate properly. In some embodiments, host 105 may comprise an existing system having an existing underlying wired or wireless communication protocol that device 130 must comply with even though it may not provide sufficient support for implementation of haptic features. As such, the wired or wireless communication protocol implemented between host 105 and device 130 may be required to overcome deficiencies of an underlying communication protocol.

As shown in FIG. 1, Host 105 comprises hardware Input/Output (I/O) hub 110 and host radio 115 coupled together by bidirectional Universal Serial Bus (USB) 120. USB 120 may comply with USB specification version 1.0, 2.0, 3.0 or any other version compatible with I/O hub 110 and host radio 115. I/O hub 110 may comprise, for example, functionality well known as Southbridge functionality. Host radio 115 may comprise, for example, the wireless hub built into Microsoft's XBOX 360™ console capable of transmitting and receiving wireless communications, e.g., at a frequency of 2.4 GHz. I/O hub 110 may be configured to receive software instructions 125 from a processor (not shown) executing, for example, a game application. I/O hub 110 forwards instructions 125 to host radio 115 via USB 120. Host radio 115 then transmits instructions 125 as commands 175 to device 130, e.g., via wireless communication link 180.

Device 130 comprises device radio/microcontroller 135 controlled by firmware 165, force feedback (FFB) microcontroller 140, motor 145, transmission 150, user interface 155 and sensor 160. Device radio/microcontroller 135 comprises, for example, a wireless transceiver, operating at the same frequency as host radio 115, coupled to an I/O interface of a microcontroller. As is well known, a microcontroller is a computer on a chip, integrating a microprocessor with volatile and nonvolatile memory and I/O interfaces, among other features of a computer. In addition to memory embedded in microcontroller 135, device 130 may include additional volatile and/or non-volatile memory (not shown). Similarly, FFB microcontroller 140 comprises a microcontroller that may be connected to additional volatile and/or non-volatile memory (not shown).

User interface 155 comprises any one or more of the wide variety of ways that a human can interact with device 130 through human interface elements, such as buttons, pads, pedals and directional devices including, but not limited to, joysticks and wheels. It is understood that human interface elements are not limited to input elements and may include output elements. Both input and output elements may provide haptic feedback to a user. An example of an input element that may provide haptic feedback is a steering wheel. The wheel is used to provide positional input and may be used to provide haptic feedback, e.g., resistive torque and/or vibrations. An example of an output element that may provide haptic feedback is a seat or pad, which may not provide any input to a game application. A user may sit in a seat or on a pad that provides vibratory sensations to the user in accordance with simulated circumstances.

An exemplary device 130 having numerous human interface elements, i.e., Microsoft's XBOX 360™ Wireless Racing Wheel, is shown in FIG. 3. With reference to FIGS. 1 and 3, where device 130 comprises Microsoft's XBOX 360™ Wireless Racing Wheel 300, for example, user interface 155 comprises numerous human interface elements, such as a steering wheel 305, accelerator pedal (not shown), brake pedal (not shown), left and right paddles 310, 315 (e.g. for simulated gear shifting), directional pad 320, four multi-purpose buttons 325, connect button 330, power/guide button 335, start button 340 and back button 345. These human interface elements allow a user to interact with or control an interactive game played by host 105. A game may react to user inputs made through the human interface elements, which is why device 130 is also referred to as a game controller. It is understood that device 130 may comprise one or more components, e.g., a racing wheel, pedal set, seat or pad, each of which may include input and/or output type human interface elements.

Sensor 160, which may comprise one or more sensors, monitors, detects and provides to FFB microcontroller 140 the user inputs made through the human interface elements, e.g., in racing wheel 300, wheel position, velocity and acceleration, button presses, paddle movement, accelerator and brake pedal positions. In some embodiments, FFB microcontroller 140 processes messages from host 105 that are received by device radio/microcontroller 135. FFB microcontroller 140 may utilize user inputs in combination with commands received from host 105 through device radio/microcontroller 135, as well as stored haptic features, to control motor 145 and/or transmission 150 to deliver haptic feedback to the user. Motor 145 comprises, for example, one or more electric motors that convert electric energy into mechanical energy, e.g., rotational or linear energy. Force feedback may be applied to any human interface element or any other portion of device 130 that can transmit a tactile sensation to the user. For example, low and high frequency vibratory rumblers (not shown) may be deployed inside hollow steering wheel 305, motor 145 may be deployed in steering column 350 to impart torque on steering wheel 305, etc. Transmission 150 variably transmits (e.g. via gear reduction) the controlled mechanical energy produced by motor 145 to one or more user interface elements in user interface 155 in accordance with one or more programmed haptic effects. For example, torque transmitted to steering wheel 305 by transmission 150 may vary depending on the simulated environment as well as user responsiveness to it.

Thus, FFB microcontroller 140 receives user input from sensor 160 and provides the user input to device radio/microcontroller 135, which may then wirelessly transmit the user input, e.g., human interface element movements 170, to host radio 115. Host radio 115 transmits movements 170 to I/O hub 110, which then provides movements 170 to a processor (not shown) that is executing, for example, a game application. Movements 170 may or may not result in new or modified software instructions 125 from the processor that is processing a game application. Nonetheless, software instructions 125 intended for device 130 are provided to I/O hub 110, which forwards them to host radio 115 via USB 120. Host radio 115 wirelessly transmits software instructions 125 as commands 175 to device radio/microcontroller 135, which provides commands 175 to FFB microcontroller 140. FFB microcontroller 140 controls motor 145 and/or transmission 150 to provide programmed haptic effects to user interface 155 in response to commands 150 and perhaps input from sensor 160. It is understood that commands 175 is used in a very broad sense to refer to commands, requests, reports and other form of instruction that may or may not be accompanied by data.

As previously described, FFB microcontroller 140 may utilize user input from sensor 160, in combination with stored haptic features and haptic control information received from host 105, to control motor 145 and/or transmission 150 to provide haptic feedback to user. This architecture may allow FFB microcontroller 140 to sustain haptic feedback between communication packets provided by host 105. This architecture is particularly useful when an underlying communication protocol does not have the bandwidth or latency requirements necessary to provide haptic feedback.

In order to convey realistic tactile sensations, haptic device 130 must be synchronized to the sights and sounds a user experiences from other sensory devices during game play. Therefore, device 130 requires relatively high bandwidth, low latency, bi-directional and an otherwise supportive communication protocol with host 105 executing a game application.

In order to improve the realism experienced using existing gaming systems, haptic devices, such as Microsoft's XBOX 360™ Wireless Racing Wheel, are being adapted to existing gaming systems, such as Microsoft's XBOX 360™ console, that have existing, i.e., underlying, communication protocols. However, underlying communication protocols, e.g., for Microsoft's XBOX 360™ console and game controllers, may place a restriction on force feedback protocol and architecture for haptic devices such as device 130. Also, underlying wireless protocols, e.g., for Microsoft's XBOX 360™ console and game controllers, may place additional restrictions on force feedback protocol and architecture for haptic devices such as device 130. Aspects of underlying communication protocols for existing gaming systems, such as header and payload definitions, frame rate, etc., contribute to limit system bandwidth and latency, which may be insufficient to deliver realistic haptic effects. There herein described haptic device works properly without redesigning existing gaming systems.

In an exemplary implementation, device 130 stores features. Haptic features are preloaded in device 130 or downloaded from host 105 to device 130, by wire or wirelessly, before or during game play. Haptic features may be preloaded, for example, at the time device 130 is manufactured or at any other time. Features stored in non-volatile device memory may be referred to as native features that may produce native effects, e.g., a built-in return-to-center spring effect stored in non-volatile memory in device 130. A game application can also download standard features for standard effects and users can create custom features for custom effects that may be loaded into device 130 in a variety of ways, including wirelessly from host 105 to device 130. Native, standard and custom force feedback features are collectively referred to as haptic features or features while the haptic effects that each produces are collectively referred to as haptic effects or effects.

A Haptic feature defines the properties of a haptic effect, which is an implementation of the feature. Haptic features may be stored within volatile or non-volatile memory within FFB microcontroller 140 or any other volatile or nonvolatile memory that may be internally or externally connected to device 130, including removable storage media. In some embodiments, each haptic feature may be specified by an effect block and one or more parameter blocks. Each effect block may set forth, for example, general or basic properties of a haptic effect such as duration, gain, start delay, loop count, etc., while one or more parameter blocks may set forth more specific parametric properties of a haptic effect such its magnitude. An example of a group of constant, ramp, periodic and conditional forces is shown in Table 1.

TABLE 1

| Effect Block | Parameter Block 1 | Parameter Block 2 | Parameter Block 3 |
|---|---|---|---|
| Constant Force | Magnitude | Envelope | N/A |
| Ramp | Ramp | Envelope | N/A |
| Square | Periodic | Envelope | N/A |
| Sine | Periodic | Envelope | N/A |

TABLE 1-continued

| Effect Block | Parameter Block 1 | Parameter Block 2 | Parameter Block 3 |
|---|---|---|---|
| Triangle | Periodic | Envelope | N/A |
| Sawtooth Up | Periodic | Envelope | N/A |
| Sawtooth Down | Periodic | Envelope | N/A |
| Spring | Condition (X) | Condition (Y) | Condition (Z) |
| Damper | Condition (X) | Condition (Y) | Condition (Z) |
| Inertia | Condition (X) | Condition (Y) | Condition (Z) |
| Friction | Condition (X) | Condition (Y) | Condition (Z) |

Referring to Table 1, a constant force has a magnitude and duration, and may also have an envelope specifying force properties before (attack) and after (fade) implementation of the constant force. An effect block for a constant force may specify duration while parameter block 1 specifies magnitude and parameter block 2 specifies an optional envelope. A ramp force has a starting and ending magnitude, duration and may have an envelope. A ramp force may change during its duration and may be described in terms of segments. A periodic force, e.g., square, sine, triangle, sawtooth up, sawtooth down, is repetitive to provide a wave or vibratory effect. Periodic forces have defined shapes, magnitudes, periods, durations and may have envelopes. A conditional force, e.g., spring, damper, inertia, friction, is, for example, dependent on motion parameters such as position, velocity or acceleration, accounted for in parameter blocks 1-3.

In some embodiments, host 105, e.g. via a game application or driver executed by host 105, may manage a portion of or all memory in or coupled to device 130. Volatile and non-volatile memory in device 130 are collectively referred to as device memory. The amount of device memory managed by host 105 is collectively referred to as a block, pool or block pool. Device 130 may provide low level memory management for a block pool, but host 105, e.g., via application or driver, could overwrite, reassign, clear and otherwise manage the block pool. Device 130 may provide a block pool for host 105 to download and/or manage haptic features, e.g., as represented by effect blocks and parameter blocks. For purposes of addressing each haptic feature stored in a block pool, a game application or driver may index (i.e. normalize) the address of each feature stored in device memory. Address indexing may help reduce the amount of information that must be communicated between host 105 and device 130.

For purposes of indexing features, reference may be made to the 11 basic features in Table 1. In some embodiments these 11 features may be treated as only 11 features irrespective of how their specific parametric properties are defined. In other words, in some embodiments a feature is defined only by its type of effect. In other embodiments, these 11 basic features may be treated as more than 11 features based on how their specific parametric properties are defined. In other words, in some embodiments a feature is defined by the combined properties of its effect block and one or more parametric blocks.

In some embodiments, host 105 may load and store effect blocks and parameter blocks together. Before loading features, device 130 may provide a report, e.g., a Device Block Pool Report, to host 105, which host 105 may use to determine the number of features that may be stored and how to organize their storage in block pool. A Device Block Pool Report may indicate, for example, the memory management mode of device 130 and the memory resources available to host 105. A Device Block Pool Report may be provided upon request, e.g., a Device State Request, and/or automatically in some instances, e.g., following initialization or a reset command. Device 130 may also provide to host 105, automatically and/or upon request, a Device Capabilities Report to indicate, for example, the capabilities and controls of device 130 and the range and resolution thereof. This may be useful to host 105 in determining which features may be implemented by device 130, which could avoid downloading useless features. The Device Capabilities Report may include, for example, the type and possibly subtype of device 130, assuming host 105 classifies type and subtype.

Like the Device Block Pool Report, the Device Capabilities Report and any other initial reports may be provided by device 130, for example, during a binding/link/discovery process between host 105 and device 130. In some embodiments, device 130 may begin interaction with host 105 by making a Device Link Request, which may alternatively provide device type and subtype information to host 105. Upon receiving a Device Link Acknowledgment from host 105, and perhaps after security handshakes, Device 130 may provide a Device Capabilities Report automatically or in response to a Device Capabilities Request message from Host 105. Examples of device types may include game controllers and assorted other devices, or perhaps the device type may differentiate between wired game controllers, wireless game controllers, haptic devices and non-haptic devices. Since there would likely be more subtypes than types, a longer bit code may be assigned for subtypes than for types. Examples of subtypes of the generic type game controller include a standard game pad, steering wheel, arcade stick, flight stick, dance pad, FFB steering wheel, FFB flight stick, etc. The Device Capabilities Report may also indicate a version of device 130, in addition to its type and subtype.

After host 105 becomes aware of device 130 and its capabilities and state, including device memory, it may proceed to load one or more features in device memory (e.g. block pool memory), whether managed by device 130 or host 105, by sending to device 130, for example, one or more Effect Block Reports, each comprising a Set Effect Block Command accompanied by effect block properties, and one or more Parameter Block Reports, each comprising a Set Parameter Block Command accompanied by parameter block properties. An example of effect and parameter block properties being stored in a block pool is shown in FIG. 2.

Figure 2:
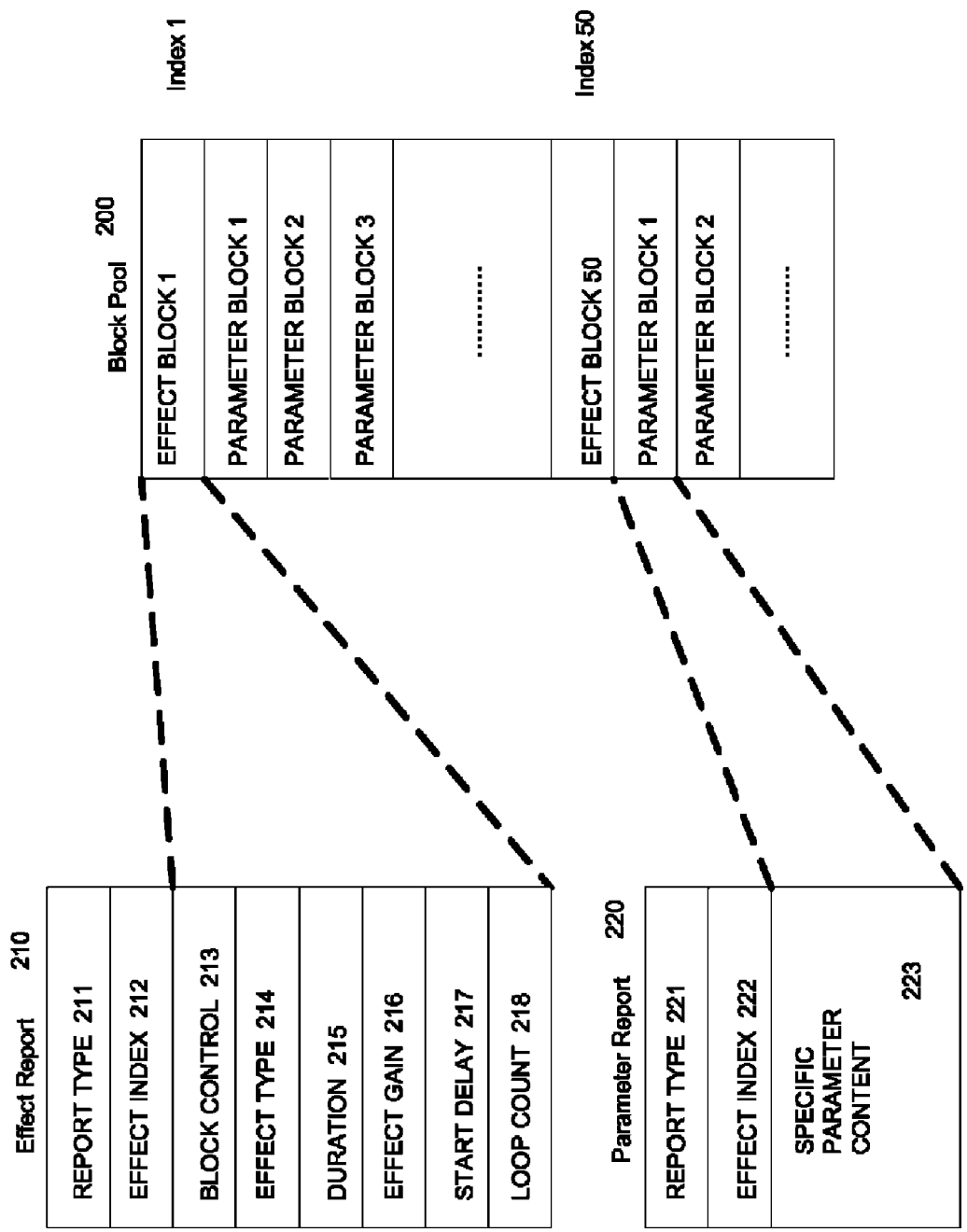
FIG. 2 illustrates an exemplary organization of device memory.

FIG. 2 illustrates an exemplary organization of device memory. As shown in FIG. 2, stored in block pool memory 200 are numerous features stored in the form of indexed effect blocks and associated parameter blocks. In some embodiments, parameter blocks may be stored together with the effect block they relate to. For example, index 1 identifies a first feature comprising effect block 1 and accompanying parameter blocks 1-3 and index 50 identifies a 50$^{th}$ feature comprising effect block 50 and accompanying parameter blocks 1-2. As is further shown in FIG. 2, the properties of each indexed feature stored in block pool 200 may, in some embodiments, arrive at device 130 in the form of an effect report 210 and one or more parameter reports 220. These reports 210, 220 may be sent from host 105 to device 130 in wireless communication packets. In some embodiments, FFB microcontroller 140 processes reports 210, 220 received by device radio/microcontroller 135.

Effect report 210 comprises, for example, eight fields totaling eight bytes or one byte each for report type 211, effect index 212, block control 213, effect type 214, duration 215, effect gain 216, start delay 217 and loop count 218. The first two bytes, i.e., report type 211 and effect index 212, explain what information or data is being provided and where to store it. Report type 211 specifies, for example, that effect report 205 is a Set Effect Block Command directing device 130 to store the accompanying effect block data in fields 213-218. Report type 211, of course, may also specify a variety of other reports including parameter reports, e.g., constant, ramp, envelope, condition x, y, z. Report type 211 may be used for additional purposes, e.g., using the most significant bit as a toggle bit to turn packet filtering on and off in device 130. Effect index 212 specifies where, i.e., at what index, the accompanying information, e.g., fields 213-218, should be stored in block pool 200. In this case, the index field indicates index 1. The first two fields, i.e., 211-212, may, but need not be stored in block pool 200. The remaining six fields 213-218 are stored in effect block 1, which is identified by index 1.

Block control 213 specifies, for example, the axes and directions to apply an effect. Each type of effect, e.g., constant, ramp, periodic, conditional, may use the settings in this field differently. Effect type 214 may identify, for example, one of the eleven types of effects listed in Table 1. Duration field 215 may identify a number of fixed time increments, or infinite duration stopped by an event such as an Effect Operation Command. Effect gain 216 may define a gain value to apply to the magnitude of an effect. For example, the gain value may be a normalized scaling factor applied to all magnitudes, including envelopes, of an effect. Start delay 217 may specify a number of time increments, including zero, to delay an effect upon loading it into an active play list. Loop count 218 specifies the number of times to repeat, for example, a periodic or ramp effect having a finite duration. The fields 211-218 specified for effect report 210 are merely exemplary and may vary from one embodiment to the next.

Parameter report 220 comprises, for example, eight fields totaling eight bytes as in the case of effect report 205 or may comprise any number of bytes necessary to convey parametric data for an index. As in the case of effect report 205, the first two bytes, i.e., report type 221 and effect index 222, explain what information or data is being provided and where to store it in block pool 200. Report type 221 specifies a Set Parameter Block Command, commanding device 130 to store accompanying data fields collectively identified as specific parameter content 223. Effect index 222 identifies index 50 in block pool 200. Thus, the first two bytes need not be stored. Specific parameter content 223 is stored in parameter block 1 under effect block 50 identified by index 50. As indicated by the embodiment in Table 1, there are several types of parameter blocks, i.e., constant, ramp, periodic, envelope, condition (x), condition (y) and condition (z). As such, there may be several independent set parameter block commands, which may be uniquely identified by different values in report type 221.

Device 130 may have block pool memory 200 of any size allowing any number of features to be stored therein. Host 105 may arrange different pools of memory or subdivide block pool 200 for native, standard and custom features. Host 105 may control the amount of device memory allocated to each indexed feature. Host 105 may allocate a uniform or nonuniform amount of device memory for each indexed feature. Within each indexed feature, host 105 may allocate a uniform or nonuniform amount of memory for each effect block and accompanying parameter block(s). While block pool 200 may store any number of indexed features, host 105 may select some or all of them as an active play list of effects, which may leave some effects dormant until added to the active play list of effects.

In addition to providing features to device 130, host 105 also makes requests for information and provides control information to control implementation of the features, to which device 130 may respond with acknowledgments and reports. Device 130 may also provide data input, e.g. movements 165. As previously discussed, host 105 may send a Device State Request message and a Device Capabilities Request message to device 130 to which device 130 responds with reports. Details of these and other communication messages along with other communication messages will now be provided as an exemplary wired or wireless communication protocol between host 105 and device 130. Some or all of the following exemplary list of commands, requests, reports and other messages between host 105 and device 130 may not be part of the underlying communication protocol, which may not provide sufficient support for haptic functionality. New messaging may be required to implement haptic functionality, perhaps more so in a wireless environment.

Device Block Pool Report. Device 130 may provide a Device Block Pool Report to host 105. A Device Block Pool Report may indicate, for example, the memory management mode of device 130 and the memory resources available to host 105. In some embodiments, device 130 may provide host 105 with a total number of memory block available, the number of bytes per memory block supported by device 130, the minimum and maximum number of features indices supported, minimum and maximum number of simultaneous haptic effects supported in an active play list, types of native effects and axes supported and a toggle bit (toggled in every message) to evade message filtering by the underlying protocol. Host 105 may use the information provided in the Device Block Pool Report to determine the number of features that may be stored, how to organize their storage in block pool and what control information to provide to device 130. A Device Block Pool Report may be provided upon request, e.g., Device State Request, and/or automatically in some instances, e.g., following initialization or a reset command. A Device Block Pool Report may be provided by device 130, for example, during a binding/link/discovery process between host 105 and device 130. In some embodiments, device 130 may begin interaction with host 105 by making a Device Link Request. Upon receiving a Device Link Acknowledgment from host 105, and perhaps after security handshakes, Device 130 may provide a Device Block Pool Report automatically or in response to a request message from Host 105.

Device State Request/Report. Upon receiving a Device State Request message from host 105, or automatically after one or more selected events such as a state change, device 130 may provide a Device Block Pool Report message to host 105. The Device State Report may initially be provided by device 130, for example, during a binding/link/discovery process between host 105 and device 130. In some embodiments, device 130 may begin interaction with host 105 by making a Device Link Request. Upon receiving a Device Link Acknowledgment from host 105, and perhaps after security handshakes, Device 130 may provide a Device State Report automatically or in response to a Device State Request message from Host 105. A Device State Report provides the current state of device 130 to host 105. For example, a Device State Report may report the power state for implementation of haptic effects (e.g. DC adapter, battery), pause state for haptic effects, reset state for haptic effects, block pool (e.g. full, empty) state where an indication of full may place the block pool in overwrite mode, force feedback motor(s) enable state (s), native feature enable state and miscellaneous other states such as a toggle bit to prevent host 105 from filtering out report messages which may appear to be repetitious to the underlying communication protocol.

Device Capabilities Request/Report. Upon receiving a Device Capabilities Request from host 105, or automatically after one or more selected events, device 130 may provide a Device Capabilities Report to host 105. The Device Capabilities Report may be provided by device 130, for example, during a binding/link/discovery process between host 105 and device 130. In some embodiments, device 130 may begin interaction with host 105 by making a Device Link Request. Upon receiving a Device Link Acknowledgment from host 105, and perhaps after security handshakes, Device 130 may provide a Device Capabilities Report automatically or in response to a Device Capabilities Request message from Host 105.

A Device Capabilities Report may be useful to host 105 in determining which features may be implemented by device 130, which could avoid downloading useless features or mishandling information provided by device 130. The Device Capabilities Report may indicate, for example, the capabilities and controls of device 130 and the range and resolution thereof. For example, the Device Capabilities report may identify human interface elements on device 130 such as triggers, push buttons, thumb controls, motor controls, directional pad controls, joysticks, start button, back button, guide button, bind button, steering controls, etc. Each human interface element may have a control resolution. For example, one control may range from 0 to 255 while another control may have a much broader range such as 0 to 65,535. Thus, the Device Capabilities Report may identify control resolutions for one or more of the supported controls. The Device Capabilities Report may also identify miscellaneous or enhanced capabilities. For example, microphone, speaker, battery charger, a plug-in module and motor axes (x, y and/or z) supported.

The Device Capabilities Report may also include, for example, the type and possibly subtype of device 130, assuming host 105 classifies type and subtype. If the type and subtype are known by host 105 then perhaps an enumeration of capabilities may be avoided. Host 105 may be manufactured with awareness of a list of device types and subtypes and may also periodically download updated lists of compatible device types and subtypes. Examples of device types may include game controllers and assorted other devices, or perhaps the device type may differentiate between wired game controllers, wireless game controllers, haptic devices and non-haptic devices. Since there would likely be more subtypes than types, a longer bit code may be assigned for subtypes than for types. Examples of subtypes of the generic type game controller include a standard game pad, steering wheel, arcade stick, flight stick, dance pad, FFB steering wheel, FFB flight stick, etc. The Device Capabilities Report may also indicate a version of device 130, in addition to its type and subtype.

Feature Play list Status Request/Report. Upon receiving a Feature Play list Status Request message from host 105, device 130 may provide a Feature Play list Status Report message to host 105. A Feature Play list Status Request may inquire about a specific play list, the index numbers or other information about the features in the play list, whether the play list is active or inactive, paused or playing and whether the play list is empty, full or may support additional features. Device 130 may respond with a Feature Play list Status Report that provides the requested information.

In addition to the exemplary requests discussed herein, host 105 may, of course, make other or additional requests of device 130. Additionally, host 105 may command device 130. Exemplary commands are now provided. Two such commands discussed with reference to FIG. 2 are the Set Effect Block Command and the Set Parameter Block Command. Device 130 may provide a Block Load Report in response to either type of command.

Block Load Report. Upon receiving a Set Effect Block Command, Effect Block Modification Command or one of several Set Parameter Block Command messages from host 105, device 130 may provide a Block Load Report message to host 105. A Block Load Report may serve to guarantee successful delivery and implementation of commands from host 105 by providing positive feedback. Device 130 may send the Block Load Report after receiving the command message from host 105, computing a checksum and determining the success or failure status of the loading of the effect or parameter block into block pool 200. The Block Load Report may comprise, for example, a command type received and executed (e.g. effect block, parameter block or modify parameter block), an indication of success or failure (perhaps elaborating on the reason for a failure with an error code), an indication whether block pool 200 is full and a checksum value (e.g. calculated by a cyclic redundancy check (CRC) or other error detection code for each byte of the command received from host 105).

Set Effect Block Command. Host 105 may send a Set Effect Block Command message to device 130 in order to store a new standard or custom feature in block pool 200. The Set Effect Block Command may comprise, for example as shown in FIG. 2, indicators for report type 211, effect index 212, block control 213, effect type 214, duration 215, effect gain 216, start delay 215 and loop count 218. Report type 211 and effect index 212 explain what information or data is being provided and where to store it. Report type 211 specifies, for example, that effect report 205 is a Set Effect Block Command directing device 130 to store the accompanying effect block data in fields 213-218. Report type 211, of course, may also specify a variety of other reports including parameter reports, e.g., constant, ramp, envelope, condition x, y, z. Report type 211 may be used for additional purposes, e.g., using the most significant bit as a toggle bit to evade packet filtering. Effect index 212 specifies where, i.e., at what index, the accompanying information, e.g., fields 213-218, should be stored in block pool 200.

Block control 213 specifies, for example, the axes and directions to apply an effect. Each type of effect, e.g., constant, ramp, periodic, conditional, may use the settings in this field differently. Effect type 214 may identify, for example, one of the eleven types of effects listed in Table 1. Duration field 215 may identify a number of fixed time increments, or infinite duration stopped by an event such as an Effect Operation Command. Effect gain 216 may define a gain value to apply to the magnitude of an effect. For example, the gain value may be a normalized scaling factor applied to all magnitudes, including envelopes, of an effect. Start delay 215 may specify a number of time increments, including zero, to delay an effect upon loading it into an active play list. Loop count 218 specifies the number of times to repeat, for example, a periodic or ramp effect having a finite duration. The fields 211-218 specified for effect report 210 are merely exemplary and may vary from one embodiment to the next.

Effect Block Modification Command. Once a feature is loaded into block pool 200, the Effect Block Modification Command is used to modify it without stopping and restarting implementation of the feature. Exemplary fields for the Effect Block Modification Command comprise some or all of the fields for the Set Effect Block Command.

Set Parameter Block Command. Host 105 may send a Set Parameter Block Command message to device 130 in order to store various properties of a new standard or custom feature in block pool 200. The Set Parameter Block Command may comprise numerous commands. The various set parameter commands may be defined within a field of a generic Set Parameter Block Command, e.g., report type. Exemplary Set Parameter Block Commands may include, for example, Set Envelope Parameter Block, Set Condition (x axis) Parameter Block, Set Condition (y axis) Parameter Block, Set Condition (z axis) Parameter Block, Set Periodic Parameter Block, Set Constant/Ramp Parameter Block.

Set Envelope Parameter Block. The Set Envelope Parameter Block describes the envelope along one or more axes, if any, to be used when implementing a feature. Exemplary fields for the Set Envelope Parameter Block include report type, index, attack level start amplitude, fade level end amplitude, attack time in incremental steps, fade time in incremental steps. The report type field identifies the type of command as a Set Envelope Parameter Block command while the index identifies the index in block pool 200 where the accompanying properties in the various fields should be stored. The values for the attack start and fade end amplitudes may be based on a normalized baseline, such that they specify a value relative to the baseline. The attack time and fade time may be based on, for example, an incremental number of multiples of the frame rate of the communication protocol.

Set Condition (x/y/z axis) Parameter Block. Besides report type and index, exemplary fields for a Set Condition (x/y/z axis) Parameter Block include a center point offset, positive coefficient operator, a negative coefficient operator, positive saturation operator, negative saturation operator and center dead band operator. A center point offset may be used, for example, to specify an offset from the resting position of a spring or a velocity at which a damping force is zero in order to convey a point where the effect of a feature begins. A positive coefficient operator specifies a constant coefficient on the positive side of a force neutral position. A negative coefficient operator specifies a constant coefficient on the negative side of a force neutral position. A positive saturation operator specifies the maximum positive force on the positive side of a force neutral position. A negative saturation operator specifies the maximum negative force on the negative side of a force neutral position. A center dead band operator specifies the region around the centerpoint offset where the force is inactive. Force algorithms and other basic properties for conditional features may be specified by respective effect blocks. Since force algorithms may vary from one feature to the next, the parameter values may represent differing information depending on the feature.

Set Periodic Parameter Block. Besides report type and index, exemplary fields for Set Periodic Parameter Block include magnitude, offset, phase, period and sample rate. The magnitude of a periodic feature represents the maximum force to be applied. A high magnitude equates to, for example, a strong vibration. The offset field shifts a force to increase it in one direction while decreasing it in the other. The phase field specifies when a low frequency periodic effect begins along its wavelength. The period is utilized to specify the frequency of vibration. The sample rate specifies a special effect. For example, a sine wave effect played at a low frequency sample rate results in a rough texture sine wave effect.

Set Constant/Ramp Parameter Block. The Set Constant/Ramp Parameter Block may be shared by constant and ramp features because they have so few properties. Besides report type and index, exemplary fields for Set Periodic Parameter Block include a constant magnitude, ramp start level and ramp end level. The constant magnitude field specifies a constant positive or negative (directional) force. For a constant force, the ramp start and ramp end fields would be set to zero. The ramp start and end levels specify starting and ending magnitudes. For a ramp force, the constant magnitude would be set to zero. The effect block portion of the ramp feature specifies a linear ramp force between the starting and ending magnitudes.

Device Data Input Report. The Device Data Input Report is specifically identified as movements 165 in FIG. 1, although much more than movements 165 may be communicated by device 130 to host 105. Exemplary fields for Device Data Input Report may include report type, buttons, left pedal position, right pedal position, axis position, etc. The report type field would of course indicate the type of report is a Device Data Input Report. The buttons field may indicate, e.g., an indication of on/off in subfields, human interaction with a selected group of on/off human interface elements including buttons, paddles, directional pads, etc. Right pedal position may indicate, for example, the position of an accelerator pedal. Left pedal position may indicate, for example, the position of a brake pedal. Axis position may indicate the x and y axis position of a stick or wheel. It would be expected that an underlying communication protocol would support, at least in part, input from device 105 to report interaction with human interface elements such as a steering wheel and buttons as shown in FIG. 4 for example. The underlying communication protocol may have an established frame rate, e.g., every few milliseconds, for device 130 to send a Device Data Input Report to host 105.

Device Control Command. A Device Control Command may be used to control overall effect operation of device 130. Exemplary fields for Device Control Command may include, control field for standard and native features and, to avoid packet filtering, a toggle bit field. The value in the control field for standard features may indicate, for example, no change, enable motors, disable motors, stop effects, reset device, pause play list and continue play list. No change indicates that Device Control Command is not making any changes to the control of standard effects in the active play list. Enabling and disabling motor fields enables or disables force feedback motors. Stop effects indicates that all effects in the active play list should be stopped. Reset device may, for example, clear the active play list of effects, clear block pool 200 of all features and enable all motors. A Device Control Command indicating reset device may be sent to device 130, for example, prior to downloading features into block pool 200. Pause play list may pause all effects in the active play list, following which, device 130 may log but not execute all effect operation commands (e.g. start, stop) until the active play list is continued, e.g., by a continue play list command. Continue play list may restart effects in the active play list that were previously paused, allowing completion of accumulated effect operation commands in the order logged. The value in the control field for native features may indicate, for example, no change, stop native effect and start native effect. No change indicates that Device Control Command is not making any changes to the control of native effects in the active feature play list. Stop and start native feature may, for example, remove or add the native effect to the active feature play list. As with other messages, a toggle bit (toggled in every message) may be useful to evade packet filtering by host radio 115 executing an underlying communication protocol.

Device Gain Command. A Device Gain Command may, for example, be used to broadcast a normalized scaling factor to all effects in the active play list. The scaling factor may increase or decrease the magnitude of each effect in the active play list. A value of zero for the scaling factor may indicate that, while the features in the active play list should still be played, device 130 should not provide any force feedback effects. As with other messages, a toggle bit (toggled in every message) may be useful to evade packet filtering by host radio 115 executing an underlying communication protocol.

Effect Operation Command/Report. An Effect Operation Command may be used to simultaneously control numerous features stored in block pool 200. Exemplary fields for Effect Operation Command may include, for example, report type, control, and index fields. The value in the report type field indicates an Effect Operation Command. The control field may indicate, for example, pool type and a specific control for each indexed feature. Pool type may differentiate, for example, active and inactive play lists, standard, custom and native features that may be stored as independent sets of features perhaps segregated in device memory. The specific control for each indexed feature may indicate, for example, no change, stop effect and start effect. Starting an effect may, for example, add a feature to an active play list while stopping it may remove it from an active play list.

In response to an Effect Operation Command, Device 130 may respond with an Effect Operation Report. An Effect Operation Report may serve to guarantee successful delivery and execution of commands from host 105 by providing positive feedback. Device 130 may send the Effect Operation Report after receiving the command message from host 105, computing a checksum and determining the success or failure status of each control command. Exemplary fields for the Effect Operation Report may comprise, for example, report type, control status, play list pause, play list empty, pool type status and a toggle bit. Report type would indicate that the report is an Effect Operation Report. Control status may indicate, for example, the successful or failed execution of each of the commands to each indexed feature. Play list pause may indicate, for example, that a command may not have been completely carried out due to a pause in the active play list. If a command had been made to play a feature during a pause then the feature may be loaded into the active play list, but would not be played until the play list is continued. Likewise, a command to stop a feature during a pause may have to wait to be unloaded from the active play list until the play list is continued. Play list empty may indicate an empty play list, e.g., due to a stop command or load errors. Pool Type Status may indicate an error if, for example, the Effect Operation Command attempted to operate on the wrong pool type. As with other messages, a toggle bit (toggled in every message) may be useful to evade packet filtering by host radio 115 executing an underlying communication protocol that seeks to eliminate seemingly duplicative messages through packet filtering.

Of course the foregoing messages are merely exemplary. Messages may also be mode-specific. For example, debugging messages may be operational only in debugging mode and not during normal operation. An Effect State Report may be sent by device 130 to host 105 whenever an indexed feature changes state. Exemplary fields of an Effect State Report may include, for example, report type, index, state value, etc. Report type would indicate that the type of report is an Effect State Report. Index would indicate which feature is being reported. State value would indicate the prevailing state of the indexed feature.

Having described an example of what messages may be communicated between host 105 and device 130, some or all of which may not exist in the underlying communication protocol, an example of how those messages are communicated will now be described. As previously described, an existing host 105 may not adequately support implementation of haptic features in device 130. As previously discussed, one way to overcome this, at least in part, may be to store standard, custom and native features in device 130. Another way to overcome this, at least in part, may be to provide additional communication messages absent from an underlying communication protocol. This additional messaging may necessitate, for example, evading certain aspects of the underlying communication protocol such as evading packet filtering using a toggle bit. Additional messaging to increase bandwidth and reduce latency may also necessitate non-compliance with header and payload definitions in the underlying protocol. The additional and/or existing communication messages may use header portions of communication packets as payload portions to increase communication bandwidth. Also, as shown in FIG. 1, there may be several underlying protocols to contend with, e.g., the protocol for USB 120 and the protocol for wireless communication of commands 175 and movements 170.

A header is typically reserved for the provision of supplemental information about a message in a payload portion of a communication packet. The payload rather than the header provides the message, whether it be an instruction and/or data. It may be necessary to redeploy the header portions of communication packets defined by one or both underlying protocols for USB 120 and the wireless link 180 between host 105 and device 130. This may vary from one embodiment to the next. In some embodiments, none, one or several redeployments may be necessary. In some embodiments, redeployment may only be unidirectional (i.e. up or downstream, but not both) while in others it may be bi-directional (i.e. up and downstream). The underlying communication protocols for USB 120 and wireless link 180 may have different protocols, each of which may define a header portion of a communication packet differently than the other. The underlying communication protocols for USB 120 and wireless 180 may even define the header and payload portions of communication packets differently for up and downstream communications. Therefore, the number of bits or bytes in a header that may be used may vary widely from one embodiment to the next. It is understood that there are numerous terms that may describe the use of a portion or all header bits to send messages, including but not limited to redeployment, reassignment, redefining, modifying, overriding, non-compliance as in not complying with the underlying protocol, etc.

In some embodiments, a header may be used in combination with payload while in other embodiments only a header portion or only a payload portion may be used for additional messaging absent from an underlying communication protocol. For example, a Device Link Request sent by device 130 to establish a wireless communication link with host 105 may provide device type and subtype in a 12 bit portion of the header portion that may be defined by the underlying communication protocol for wireless link 180, e.g., 4 bits for type and 8 bits for subtype. As another example, five downstream messages from host 105 to device 130 may be transmitted to device 130 entirely in six to 12 header bits. The five downstream messages may include, for example, Device State Request, Feature Play Status Request, Device Capabilities Request, Device Control Command and Device Gain Command. These, and perhaps other messages, may each be assigned a unique six bit identifier. Command messages, e.g., Device Control Command and Device Gain Command, may use an additional six header bits for control fields to control, as previously described, standard and custom features, native features and haptic effect gain plus a one bit toggle field to evade packet filtering. Other downstream messages may be sent within, for example, an eight-byte payload defined by the underlying wireless communication protocol.

Upstream messages may have available more or less header and payload resources. For example, in a 40 bit message header and a 19 byte payload protocol, 16 header bits plus the payload may be used for new upstream messages to support haptic effects. For example, Device State Report, Block Load Report, Effect Operation Report, perhaps among other upstream messages, may be transmitted to host 105 entirely in a header portion of a communication packet. They may be assigned, for example, a unique four-bit identifier plus an additional 11 bits to provide the information requested by host 105, as previously discussed, plus an additional bit to toggle to evade packet filtering. Other upstream messages may be sent within, for example, a 19-byte payload defined by the underlying wireless communication protocol.

As previously described, the integrity of communications may be maintained though a number of aspects of the wired or wireless overlay communication protocol over an underlying communication protocol. One such method is message pairing, e.g., pairing a particular request or command message from host 105 to a particular report from device 130. Another is requiring positive feedback. Yet another is error checking, e.g., providing checksum values in reports. Yet another is requiring a status not only for receipt, but for the resulting execution of requests and commands. The use of toggle bits and packet counters further improve the integrity of communications. These various aspects of the protocol mitigate dropouts, lost packets and filtered packets to essentially guarantee delivery. As such, retries may occur less often. Further, device 130 may, in certain cases, be allowed to respond immediately or within several frames or time certain in accordance with the overlying communication protocol.

Exemplary Host System

An exemplary host system comprises, for example, a game console, such as an XBOX® game console, or general purpose computer. FIGS. 4 and 5 provide block diagrams of exemplary host shown in FIG. 1.

FIG. 4 is a block diagram of an exemplary host in which an enhanced protocol and architecture for low bandwidth force feedback game controller can be implemented. FIG. 4 provides greater detail of host 105 shown in FIG. 1. Game console 400 comprises hardware, firmware and software. Game console 400 executes game applications (not shown). For purposes of simplicity, not all components or interconnectivity are shown and some components have been merged in exemplary game console 400.

Game console 400 comprises central processing unit (CPU) 401, which has level 1 (L1) cache 402, level 2 (L2) cache 404, and ROM (Read-Only Memory) 406. Level 1 and Level 2 cache 402, 404 temporarily store executable instructions and/or data, thereby improving processing speed and throughput. ROM 406 may store basic executable instructions (i.e. firmware) that are loaded during an initial phase of a boot process when the game console 400 is initially powered. Alternatively, the executable code that is loaded during the initial boot phase can be stored in another type of non-volatile memory. ROM 406, or the alternative non-volatile memory need not be embedded within CPU 401. Game console 400 may optionally be a multi-processor system. For example, game console 400 may have three processors 401, 403, and 405, where processors 403 and 405, which may be similar or dissimilar to processor 401. CPU's 401, 403 and 403 may share cache memory (not shown).

Game console 400 further comprises graphics processing unit (GPU) 408, which is coupled to CPU 401, and any additional processors such as CPUs 403, 405, by a bus. GPU 408 is also coupled by one or more busses each to memory controller 410, I/O (input/output) hub 418 and video codec (coder/decoder) 414. Memory controller 410 and video codec 414 may form part of GPU 408. GPU 408, in addition to video processing functionality, may comprise functionality commonly referred to as Northbridge. Northbridge functionality generally comprises a high speed memory and video hub having a memory controller and a video controller. In exemplary game console 400, both CPU 401 and I/O hub (Southbridge) 418 access memory 412 through Northbridge functionality in GPU 408. Memory controller 410 facilitates access to various types of memory 412, which may be RAM (Random Access Memory) or other variety of memory.

GPU 408 and video codec 414 together form a video processing pipeline for high speed, high resolution graphics processing required by many game applications. Data is carried from GPU 408 to/from video codec 414 via a bi-directional bus. This video processing pipeline outputs data to A/V (audio/video) port 440 for transmission to a television or other video display device (not shown). Game console 500 may have its own integrated display. Not shown is a digital to analog converter (DAC) that may be coupled between video codec 414 and A/V port 440.

Game console 400 further comprises I/O hub 418, which may comprise, among other functionality, functionality commonly referred to as Southbridge. Southbridge functionality generally performs and controls functions that are relatively slow compared to functions performed and controlled by Northbridge. I/O hub 418 comprises I/O controller 420, system management controller 422, audio processing unit 423, network interface controller 424, USB host controllers 426, 428 and front panel I/O subassembly 430. USB controllers 426, 428 serve as hosts for peripheral controllers 442(1), 442(2), wireless adapter 448, and memory unit 446 (e.g., flash memory, CD/DVD ROM, hard drive, other removable media). Network interface 424 and/or wireless adapter 448 provide access to a network (e.g., local area network (LAN), Internet) and may be any of a wide variety of various wired or wireless interface components including an Ethernet card, modem, Bluetooth module, and the like.

System memory 443 may store application data that is loaded during the boot process. Media drive 444 may comprise, for example, a DVD/CD drive, hard drive or other fixed or removable media reader and/or writer. Game application data may be read from and/or written to media via media drive 444 for execution, playback, etc. by game console 400. Media drive 444 is connected to I/O controller 420 via a bus, such as a Serial ATA bus or other high speed connection (e.g., IEEE 5394). Game console 400 may include hard disk 452, which may be used, for example, to store an operating system, game applications, game data or other types of data.

System management controller 422 provides a variety of service functions for game console 400. Audio processing unit 423 and audio codec 432 form a corresponding audio processing pipeline that may provide high fidelity, 5D, surround, and stereo audio processing of sounds produced by, for example, a game application. Audio data is carried between audio processing unit 423 and audio codec 432 via a communication link. The audio processing pipeline outputs audio data to A/V port 440 for implementation by a device having audio capabilities.

Front panel I/O subassembly 430 supports the functionality of various controls such as power button 450 and eject button 452, as well as any LEDs (light emitting diodes) or other indicators exposed on the outer surface of game console 400. System power supply module 436 provides power to components of game console 400 while fan 438 cools them.

CPU 401, GPU 408, memory controller 410, and various other components within game console 400 are interconnected via one or more buses, including serial and parallel buses, a memory bus, a peripheral bus, and a processor or local bus using any of a variety of bus architectures. As previously noted, not all buses or other connections are shown in FIG. 4.

When game console 400 is powered on or rebooted, application data and/or instructions can be loaded from system memory 443, media drive 444, hard disc 453 or other memory into memory 412 and/or caches 402, 404 and executed on the CPU 401. The game application being executed may present a graphical user interface that provides a consistent user experience when navigating to different media types available on or to game console 400. Instructions and/or data accessible via media drive 444, system memory 443, hard disk 453 or other memory may be launched, played or otherwise accessed from these various sources to provide additional functionality to game console 400.

Game console 400 may be operated as a stand alone system by connecting the system to a television or other display. As previously noted, game console 400 may have an integrated display. In this stand alone mode, game console 400 may allow one or more users to interact with the system, watch movies, listen to music, play games and the like. Network interface 424 or wireless adapter 448 may allow game console 400 to be operated as a participant in a local or wide area network community.

FIG. 5 and the following discussion provide a brief general description of a suitable computing environment in which enhanced protocol and architecture for low bandwidth force feedback game controller can be implemented. Although not required, various aspects of enhanced protocol and architecture for low bandwidth force feedback game controller can be described in the general context of computer executable instructions, such as program modules, being executed by a computer, such as a personal computer, client workstation or a server. Generally, program modules include routines, programs, objects, components, data structures and the like that perform particular tasks or implement particular abstract data types. Moreover, implementation of enhanced protocol and architecture for low bandwidth force feedback game controller can be practiced with other computer system configurations, including hand held devices, multi processor systems, microprocessor based or programmable consumer electronics, network PCs, minicomputers, mainframe computers, and the like. Further, enhanced protocol and architecture for low bandwidth force feedback game controller also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the application programs component (also referred to as the "user component" or "software component"). In various embodiments of a computer system the hardware component may comprise central processing unit (CPU) 521, memory (both ROM 564 and RAM 525), basic input/output system (BIOS) 566, and various input/output (I/O) devices such as keyboard 540, mouse 562, display 545, and/or printer (not shown), among other components. The hardware component comprises the basic physical infrastructure for the computer system.

The application programs component comprises various software programs including but not limited to compilers, database systems, word processors, business programs, video games, and so forth. Application programs provide the means by which computer resources are utilized to solve problems, provide solutions, and process data for various users (machines, other computer systems, and/or end-users). In an example embodiment, application programs perform the functions associated with enhanced protocol and architecture for low bandwidth force feedback game controller as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 5, an exemplary general purpose computing system includes a conventional computing device 560 or the like, including a processing unit 521, a system memory 562, and a system bus 523 that couples various system components including the system memory to the processing unit 521. Processing unit 521 may comprise, for example, a CPU, Northbridge and Southbridge chipset, among other components. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 525 for reading from and writing to a hard disk (not shown), a magnetic disk drive 528 (e.g., floppy drive) for reading from or writing to a removable magnetic disk 529 (e.g., floppy disk), and an optical disk drive 530 for reading from or writing to a removable optical disk 531 such as a CD ROM or other optical media. The hard disk drive 525, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer executable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules comprising computer-executable instructions can be stored on any one or more computer-readable mediums such as the hard disk, magnetic disk 529, optical disk 531, ROM 564, or RAM 525, including an operating system 535, one or more application programs 536, other program modules 535, and program data 538. A user may enter commands and information into the computing device 560 through input devices such as a keyboard 540 and pointing device 562 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). Aside from mouse 542, keyboard 540 and modem 554, serial port I/F 546 may also be connected to a wireless communications device (not shown). A display 545 or other type of display device is also connected to the system bus 523 via an interface, such as a video adapter 548. In addition to display 545, computing devices typically include other peripheral output devices (not shown), such as speakers and printers. The exemplary environment of FIG. 6 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 6. The logical connections depicted in FIG. 6 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of enhanced protocol and architecture for low bandwidth force feedback game controller are particularly well-suited for computerized systems, nothing in this document is intended to limit the enhanced protocol and architecture for low bandwidth force feedback game controller to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for enhanced protocol and architecture for low bandwidth force feedback game controller, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing enhanced protocol and architecture for low bandwidth force feedback game controller.

The program(s) can be implemented in assembly or machine language, if desired. In any case, the language can be a compiled or interpreted language, and combined with hardware implementations. The methods and apparatuses for implementing enhanced protocol and architecture for low bandwidth force feedback game controller also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of enhanced protocol and architecture for low bandwidth force feedback game controller. Additionally, any storage techniques used in connection with enhanced protocol and architecture for low bandwidth force feedback game controller can invariably be a combination of hardware and software.

While enhanced protocol and architecture for low bandwidth force feedback game controller has been described in connection with the example embodiments of the various figures, it is to be understood that other similar embodiments can be used or modifications and additions can be made to the described embodiments for performing the same functions of enhanced protocol and architecture for low bandwidth force feedback game controller without deviating there from. Therefore, enhanced protocol and architecture for low bandwidth force feedback game controller as described herein should not be limited to any single embodiment, but rather should be construed in breadth and scope in accordance with the appended claims.

What is claimed:

1. A method comprising:
    providing an enhanced wireless communication protocol by redefining an existing wireless communication protocol that is used on a device; and
    using the enhanced wireless communication protocol to transport information between the device and a host system, the information directed at generating in the device, one or more hitherto unsupported feedback effects of a haptic feature.

2. The method in accordance with claim 1, the information transported over the enhanced wireless communication protocol comprises control information for executing the one or more hitherto unsupported feedback effects in accordance with the control information.

3. The method in accordance with claim 2 further comprising:
    enhancing, in accordance with the enhanced wireless communication protocol, the properties of the one or more existing feedback effects.

4. The method in accordance with claim 2, the control information comprising at least one of an enable command, a disable command, a start command, a stop command, a pause command, a continue command, or a reset command.

5. The method in accordance with claim 1, the device being responsive to human input, the method further comprising:
    selecting, in response to human input, a first feedback effect amongst the one or more hitherto unsupported feedback effects.

6. The method in accordance with claim 1, wherein:
    the device is a peripheral to the host system;
    the peripheral comprises a game controller; and
    the host system comprises one of a game console or a personal computer.

7. The method in accordance with claim 1, wherein the host system manages at least a portion of a memory of the device for storing additional features for generating a plurality of haptic effects in the device.

8. The method in accordance with claim 1, the method further comprising:
    providing, in accordance with the enhanced wireless communication protocol, a status message to the host system in response to the provision of features and/or control information to the device.

9. The method in accordance with claim 1, the method further comprising:
    providing to the device a plurality of features indicative of a plurality of haptic effects;
    storing, in a memory of the device, the provided features; and
    providing to the device, in accordance with the enhanced wireless communication protocol, control information for controlling implementation of the stored features indicative of the haptic effects.

10. The method in accordance with claim 1, wherein the enhanced wireless communication protocol specifies header and payload portions of communication packets different than those in the existing wireless communication protocol.

11. The method in accordance with claim 1, wherein the enhanced wireless communication protocol includes messages absent from the existing communication protocol.

12. The method in accordance with claim 10, the method further comprising:
    sending a message using as a payload portion at least a portion of the header portion of a communication packet specified by the existing wireless communication protocol.

13. A device for providing a haptic effect, the device comprising:
    an input/output portion configured to receive via an enhanced wireless communication protocol, control information for a haptic feature, wherein the enhanced wireless communication protocol is a modified version of a pre-existing wireless communication protocol used on the device;
    memory for storing the haptic feature; and
    a processing portion configured to implement the haptic feature in accordance with the control information.

14. The device in accordance with claim 13, wherein:
    the device is configured as a peripheral of a host system;
    the peripheral comprises a game controller; and
    the device is configured to permit the host system to manage at least a portion of the memory.

15. The device in accordance with claim 13, the enhanced wireless communication protocol subject to the pre-existing communication protocol, and the device is configured to provide a message to the host that uses as a payload portion at least a portion of the header portion of a communication packet specified by the pre-existing communication protocol.

16. The device in accordance with claim 14,
    the enhanced wireless communication protocol
    configured to provide a message to the host that is absent from the pre-existing communication protocol.

17. The device in accordance with claim 16, the host system engaging in message filtering, wherein the device is configured to evade the message filtering.

18. A computer-readable storage medium having computer-executable instructions stored thereon for performing the steps of:
    storing a haptic feature in device, the feature being provided to the device in accordance with an enhanced wireless communication protocol that is a redefined version of an existing wireless communication protocol used on the device; and
    using the enhanced wireless communication protocol to receive information directed at generating in the device, one or more hitherto unsupported feedback effects of the haptic feature.

* * * * *